H. A. PARR.
COMBINATION DENTAL AND SURGICAL TOOL.
APPLICATION FILED MAR. 25, 1911. RENEWED JULY 17, 1912.
1,052,374.
Patented Feb. 4, 1913.
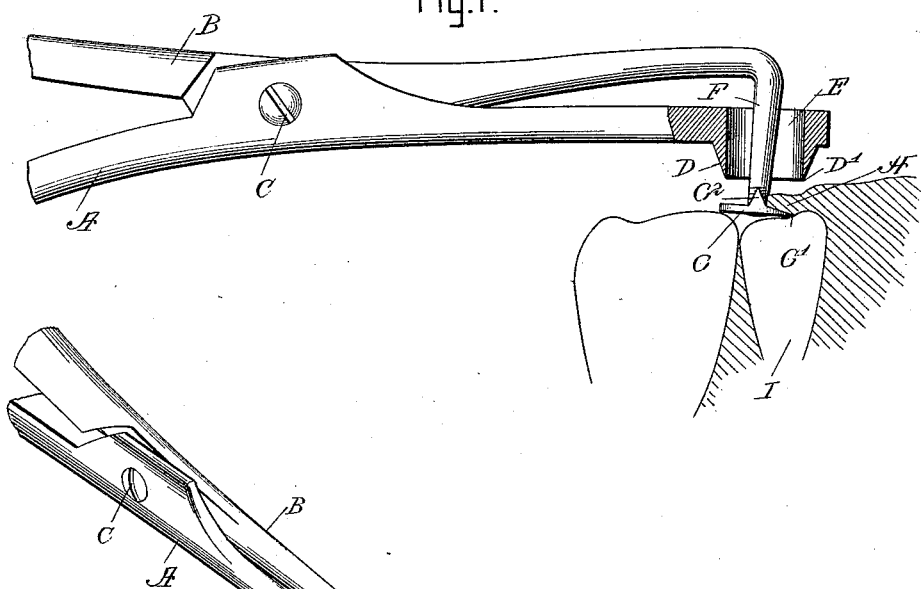
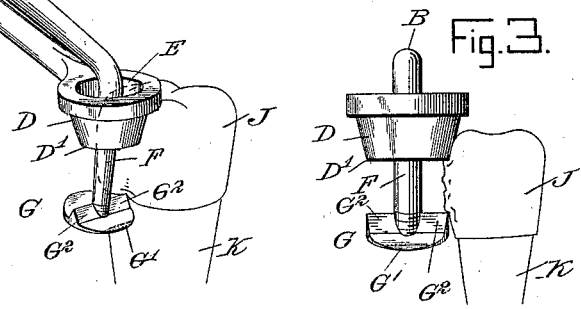
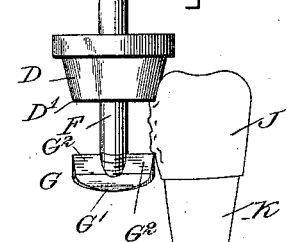
WITNESSES:
INVENTOR
Henry A. Parr
BY Munn & Co.
ATTORNEYS

UNITED STATES PATENT OFFICE.

HENRY A. PARR, OF NEW YORK, N. Y.

COMBINATION DENTAL AND SURGICAL TOOL.

1,052,374. Specification of Letters Patent. Patented Feb. 4, 1913.

Application filed March 25, 1911, Serial No. 616,821. Renewed July 17, 1912. Serial No. 710,057.

*To all whom it may concern:*

Be it known that I, HENRY A. PARR, a citizen of the United States, and a resident of the city of New York, borough of Manhattan, in the county and State of New York, have invented a new and Improved Combination Dental and Surgical Tool, of which the following is a full, clear, and exact description.

The object of the invention is to provide a new and improved combination surgical and dental tool, more especially designed for cutting superfluous flesh, such, for instance, as grows over the wisdom tooth or other part in the mouth of a person, and for readily slitting or cutting cap crowns preparatory to removing the same whenever it is desired to do so.

For the purpose mentioned, use is made of a pair of pivoted handled levers, provided at their forward ends with coacting knives, of which one is tubular and the other is in the form of a disk having a shank extending through the opening of the tubular knife to connect with its own handle.

A practical embodiment of the invention is represented in the accompanying drawings forming a part of this specification, in which similar characters of reference indicate corresponding parts in all the views.

Figure 1 is a sectional side elevation of the combination surgical and dental tool in position for cutting the superfluous flesh that has grown over a wisdom tooth; Fig. 2 is a perspective view of the combination surgical and dental tool, in position for slitting or cutting the side of a cap crown; and Fig. 3 is a front elevation of the same.

The pair of handled levers A and B are pivotally connected with each other by a transverse pivot C, and on the forward end of the lever A is secured or formed a depending tubular knife D through the opening E of which extends a shank F depending from the forward end of the lever B and carrying at its lower end a disk knife G. The disk knife G preferably screws on, or is otherwise removably attached to the shank F so as to permit convenient removal of the disk knife for sharpening and other purposes. The disk knife G is provided at the front with a segmental cutting edge G' adapted to coact with the annular cutting edge D' of the tubular knife D, the said disk knife G being adapted to pass into the opening E at the cutting edge D' to insure a shearing cut for cutting off superfluous flesh H that overlies the wisdom tooth I, as indicated in Fig. 1.

It will be noticed that in using the tool, the cutting edge G' of the disk knife G is passed under the superfluous flesh H at the time the knives D and G are in open position, as indicated in Fig. 1, and then on the operator manipulating the levers A and B with a view to close the knives D and G, that is, to move the knife D downward, then the cutting edges D' and G' coact to cut a segmental portion out of the flesh H, and this operation can be repeated until the desired amount of superfluous flesh is removed. It will further be noticed that by the arrangement described, the person operated on is not required to open the mouth very wide, as it is only necessary to open the mouth sufficiently for the forward end of the lever B with the shank F and disk knife G, to pass into proper position for cutting off the superfluous flesh.

On the top of the disk knife G are arranged transversely-extending cutting edges $G^2$ located at the sides of the front cutting edge G', the said cutting edges $G^2$ and the cutting edge D' being adapted to cut or slit the side of the cap crown J held over a tooth K, as plainly indicated in Figs. 2 and 3. It is understood that in slitting or cutting the side of a crown, the knives are moved into open position, as indicated in Fig. 2, so that one of the cutting edges $G^2$ engages the bottom edge of the crown J, while the cutting edge D' engages the side of the crown near the top thereof, and on closing the knives the cutting edges $G^2$ and D' slit or cut the side of the crown so that the crown can be readily removed from the tooth K. By having the cutting edges $G^2$ arranged diametrically as indicated in the drawings, the tool can be used for slitting the crown of a tooth in the left or right side of the mouth.

Having thus described my invention, I claim as new and desire to secure by Letters Patent:

1. A combination dental and surgical tool, comprising a pair of pivoted levers, and knives at the forward ends of the said levers, one of the knives being tubular and the other knife having a segmental cutting edge adapted to coact with the cutting edge of the tubular knife, and having a shank extending through the opening in the tubular knife.

2. A combination dental and surgical tool, comprising a pair of pivoted levers, and knives at the forward ends of the said levers, one of the knives being tubular and the other knife being in the form of a disk having a shank extending through the opening in the tubular knife, the disk having on its top a transversely-extending cutting edge adapted to operate in conjunction with the cutting edge of the tubular knife for slitting the side of a cap crown.

3. A combination dental and surgical tool, comprising a pair of pivoted levers, a tubular knife at the forward end of one of the said levers, a disk knife having a shank extending through the opening of the said tubular knife to connect with the forward end of the other lever, the said disk knife having a segmental cutting edge adapted to coact with the cutting edge of the tubular knife and adapted to pass into the said tubular knife.

4. A combination dental and surgical tool, comprising a pair of pivoted levers, a tubular knife at the forward end of one of the said levers, a disk knife having a shank extending through the opening of the said tubular knife to connect with the forward end of the other lever, the said disk knife having a segmental cutting edge adapted to coact with the cutting edge of the tubular knife and adapted to pass into the said tubular knife, and a transverse cutting edge on the top of the disk knife to one side of the said segmental cutting edge, the said transverse cutting edge operating in conjunction with the cutting edge of the said tubular knife.

In testimony whereof I have signed my name to this specification in the presence of two subscribing witnesses.

HENRY A. PARR.

Witnesses:
 THEO G. HOSTER,
 PHILIP D. ROLLHAUS.

---

Copies of this patent may be obtained for five cents each, by addressing the "Commissioner of Patents, Washington, D. C."